United States Patent [19]

Kobayashi et al.

[11] Patent Number: 4,865,151
[45] Date of Patent: Sep. 12, 1989

[54] ACTUATOR AND AN AUTOMATIC CAR-SPEED CONTROLLER

[75] Inventors: Kyoji Kobayashi; Noboru Kaneko, both of Yokohama; Kiyoshi Konishi; Takeo Furuya, both of Kanagawa, all of Japan

[73] Assignee: Jidosha Denki Kogyo Kabushiki Kaisha, Kanagawa, Japan

[21] Appl. No.: 181,945

[22] Filed: Apr. 15, 1988

[30] Foreign Application Priority Data

Apr. 15, 1987 [JP] Japan .................. 62-90918
Apr. 15, 1987 [JP] Japan .................. 62-90919

[51] Int. Cl.⁴ .................................. B60K 31/04
[52] U.S. Cl. ............................ 180/179; 123/361
[58] Field of Search ........... 180/170, 178, 179, 175, 180/176, 177; 123/361, 396, 399; 74/89.18, 97, 98, 479

[56] References Cited

U.S. PATENT DOCUMENTS

| | | | |
|---|---|---|---|
| 2,011,651 | 8/1935 | Puffer | 123/361 X |
| 3,207,255 | 9/1965 | Hahlgauss et al. | 123/361 X |
| 3,547,216 | 12/1970 | Marie | 180/170 X |
| 4,367,805 | 1/1983 | Totani et al. | 180/179 |
| 4,495,912 | 1/1985 | Yanagisawa et al. | 123/361 X |
| 4,714,864 | 12/1987 | Yogo et al. | 123/361 X |

FOREIGN PATENT DOCUMENTS 0139523  6/1986  Japan .................. 180/178

Primary Examiner—Charles A. Marmor
Assistant Examiner—Brian L. Johnson
Attorney, Agent, or Firm—Sughrue, Mion, Zinn, Macpeak & Seas

[57] ABSTRACT

An automatic car-speed controller is disclosed, which is provided with an actuator having a solenoid clutch comprising a sector wheel rotatable around a shaft and an output pulley rotatable independently from the sector wheel around the shaft coaxially. The sector wheel consists of a gear portion, a solenoid, and a sector arm alienating the solenoid from a rotational center thereof. The output pulley consists of a pulley portion attached with a throttle cable nearly to the rotational center, a magnetic body attracted by the solenoid of the sector wheel, and an arm connecting the magnetic body with the pulley portion.

2 Claims, 8 Drawing Sheets

FIG. 4
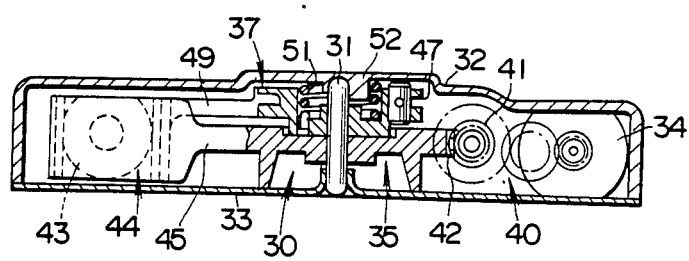
FIG. 7 *(PRIOR ART)*
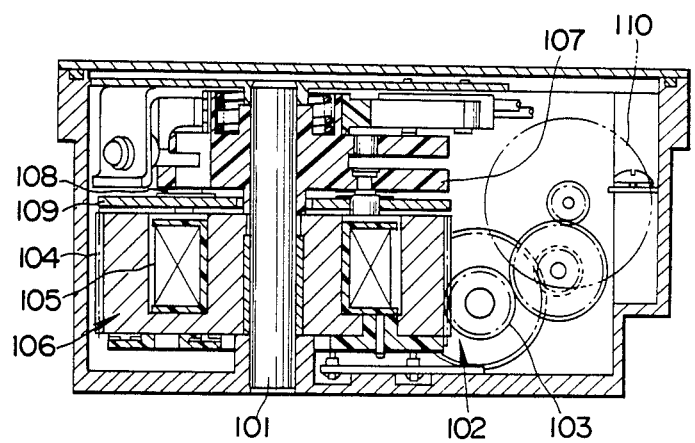

ACTUATOR AND AN AUTOMATIC CAR-SPEED CONTROLLER

BACKGROUND OF THE INVENTION

1. Field of the Invention

This invention relates to an automatic car-speed controller suitable to automatically control the traveling speed of a car at a set point by using a small sized-actuator for driving a throttle by a motor.

2. Description of the Prior Art

Heretofore, there have been many types of such automatic car-speed controllers. Among them, there has been an automatic car-speed controller comprising a car-speed sensor for outputting operation data proportional to the actual car-speed, a command switch for outputting a cruise command signal, a car-speed memorizing means for memorizing the operating data from said car-speed sensor in response to an operation of said command switch, an actuator for driving a throttle, and a control means for giving instructions to said actuator in response to the difference between the actual and memorized car-speed.

The actuator of this automatic car-speed controller has been constructed as shown in FIGS. 7 and 8 for example.

Namely, the actuator has a structure wherein a solenoid 106 comprised of an electromagnetic coil 105 is formed in a worm wheel 104 rotatably fitted on a shaft 101 and engaged with a worm 103 of a reduction gear 102. An output pulley 107 rotatably fitted on a shaft 101 is arranged on the upside of the solenoid 106 and the base of the output pulley 107 is provided with an armature 109 connected by a plate spring 108. When the control means actuates the solenoid 106 and rotates a motor 110 in the case of controlling the car-speed, the solenoid 106 attracts the armature 109 against the restoring force of the spring 108, the solenoie 106 is rotated through the reduction gear 102, and the throttle 112 is actuated through the throttle cable 111 attached to the output pulley 107.

However, in the conventional automatic car-speed controller as mentioned above, since the solenoid 106 attracts the armature 109 of the output pulley 107 on the same shaft with the solenoid 106 of the actuator according to the directions from the control means in the case of controlling the car-speed, the output pulley 107 cannot be perfectly synchronized with the solenoid 106 without using a solenoid having a large attractive force. Thus there is a problem in that the thickness of the actuator becomes very large.

In the case of cancelling the system such as during a braking operation, synchronization of the solenoid 106 with the output pulley 107 is released by cutting off the current to the solenoid 106 according to directions from the control means. However, sometimes synchronization of the solenoid 106 with the output pulley 107 cannot be released quickly enough in spite of cutting off the current to the solenoid 106 due to the residual magnetization produced in the armatures 109 because of using a large-sized solenoid 106. Therefore there is a problem in that it is necessary to ensure the safety of the system by rotating the motor 110 in the direction toward the idling position according to directions from the control means.

SUMMARY OF THE INVENTION

The present invention is made in veiw of the aforementioned problems of the prior and an object of the invention is to provide an automatic car-speed controller which can execute the actuating and cancelling of the system with certainty according to directions from the control means and can return the output pulley to its idling position with certainty especially at the time of cancelling the system by using a small-sized solenoid free from the effects of residual magnetization.

The automatic car-speed controller according to this invention is characterized by having an actuator for driving a throttle by a motor with a reduction gear, and a solenoid clutch comprising a sector wheel rotatable around a shaft and an output pulley rotatable independently from said sector wheel around said shaft coaxially through a throttle cable, said sector wheel consisting of a gear portion engaged with said reduction gear of the motor, a solenoid, and a sector arm alienating said solenoid from a rotational center thereof as a body, and said output pulley consisting of a pulley portion attached with said throttle cable at a point near an outer periphery thereof, a magnetic body attracted by said solenoid of the sector wheel, and an arm connecting said magnetic body with said pulley portion as a body. The solenoid is allocated at a position more distant than that of the outer periphery of said pulley portion from the rotational center.

An automatic car-speed controller according to the preferred embodiment of the invention has a car-speed sensor for outputting operating data proportional to the actual car-speed, a command switch for outputting a cruise command signal, a car-speed memorizing means for memorizing the operating data of said car-speed sensor in response to an operation of said command switch, and a control means for supplying power to the solenoid of the actuator and giving a command to said motor corresponding to a difference between actual car-speed and memorized car-speed in order to control the car-speed, and for cutting off power supply to said solenoid in order to cancel the automatic car-speed control and outputting a reverse rotational command to the motor so as to return said sector wheel to an idling position when said output pulley returns, in addition to said actuator.

BRIEF DESCRIPTION OF THE DRAWINGS

FIG. 4 is a vertical sectional view of FIG. 3;

FIGS. 7 and 8 are a vertical sectional view and a top view showing the construction of the conventional actuator.

DETAILED DESCRIPTION OF THE INVENTION

Figure 1:
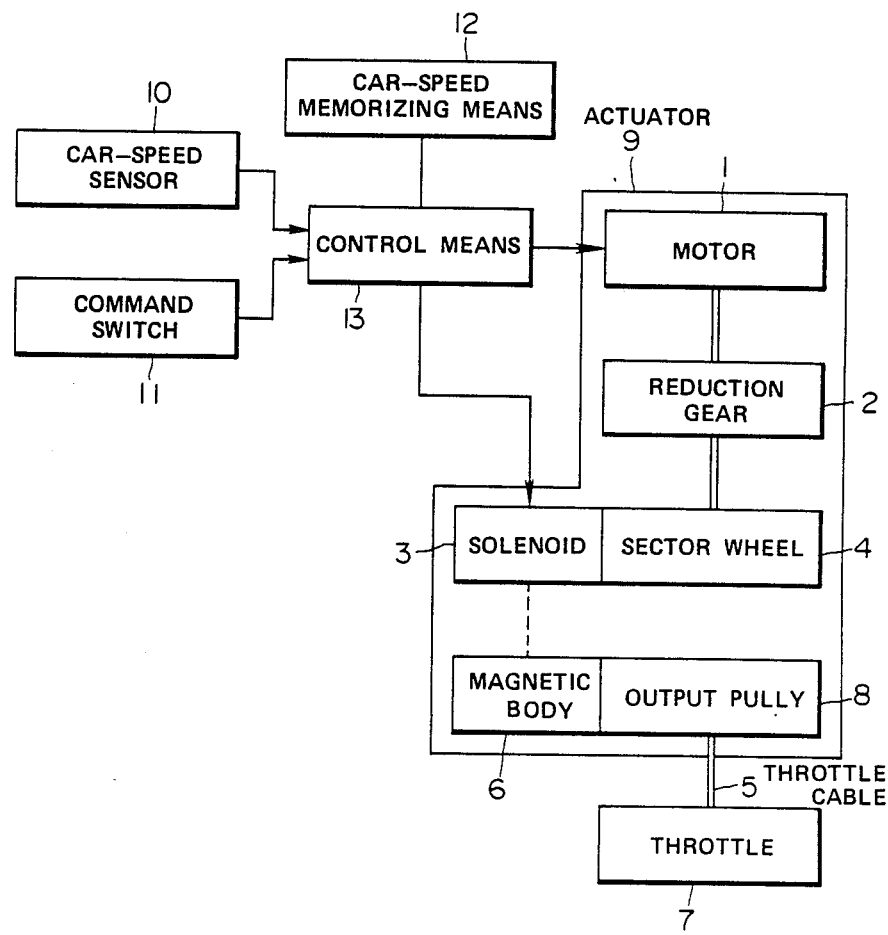
FIG. 1 is a functional block diagram showing the arrangement of the actuator and automatic car-speed controller according to this invention.

The arrangement of the actuator and automatic car-speed controller according to this invention to accomplish the above-mentioned objects will be illustrated using a functional block diagram as shown in FIG. 1.

The actuator 9 has a reduction gear 2 to reduce the rotational speed of motor 1, a sector wheel 4 provided with a solenoid 3 at a position distant from the rotational center thereof and moved by engaging with said reduction gear 2, and an output pulley 8 rotatable independently from the sector wheel 4 on the same shaft coaxially and attached with an end of throttle cable 5 to a point near the rotational center thereof and provided with a magnetic body 6 at a position to be attracted by said solenoid 3 to drive a throttle 7.

The automatic car-speed controller comprises the actuator 9 of which output pulley 8 is energized always toward an idling position by a spring, a car-speed sensor 10 for outputting operating data proportional to the actual car-speed, a command switch 11 for outputting a cruise command signal, a car-speed memorizing means 12 for memorizing the operating data from said car-speed sensor 10 in response to operation of said command switch 11, and a control means 13 for energizing the solenoid 3 of the actuator 9 with electricity and giving instructions to said motor 1 corresponding to a difference between the actual and memorized car-speed in the case of controlling a car-speed, and to de-energize the solenoid 3 and return the sector wheel 4 to the idling position in the case of cancelling the automatic control of the car-speed.

When the automatic car-speed controller according to this invention controls the car-speed, the control means 13 excites the solenoid 3 and rotates the motor 1, and the solenoid 3 attracts the magnetic body 6, so that the throttle 7 is controlled by means of rotating the output pulley 8 with the sector wheel 4.

Hereupon, the solenoid 3 is mounted at a position distant from the rotational center of the sector wheel 4, and one end of the throttle cable 5 is attached to the output pulley 8 at a point near its rotational center. Thus, the throttle 7 can be driven even if the attractive force of the solenoid 3 which attracts the magnetic body 6 of the output pulley 8 is not so powerful according to the action of the lever, because the distance between the solenoid 3 and the rotational center is sufficiently long as compared with the distance between the point of attachment of the throttle cable 5 and the rotational center. Therefore, the throttle 7 can be returned to the idling position free from influence of residual magnetization by halting the excitation of the solenoid 3 according to directions from the control means 13 in the case of cancelling the system because a small-sized solenoid can be used. At this time, the sector wheel 4 is quickly returned to the idling position according to directions from the control means 13 and is prepared for controlling the car-speed again.

DESCRIPTION OF THE PREFERRED EMBODIMENT

Figure 2:
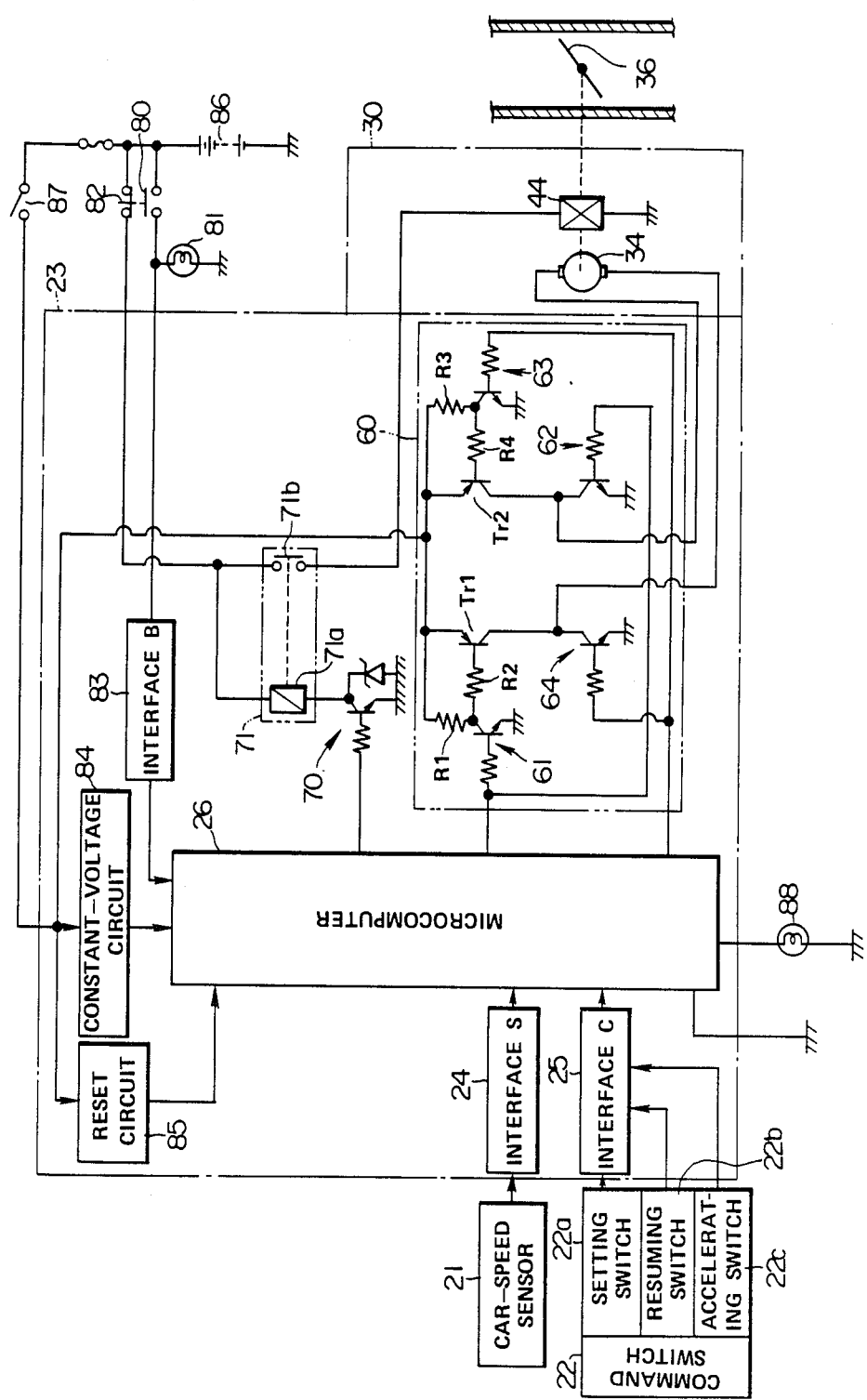
FIG. 2 is a diagram illustrating the circuitry of an example of the automatic car-speed controller according to this invention.
Figure 3:
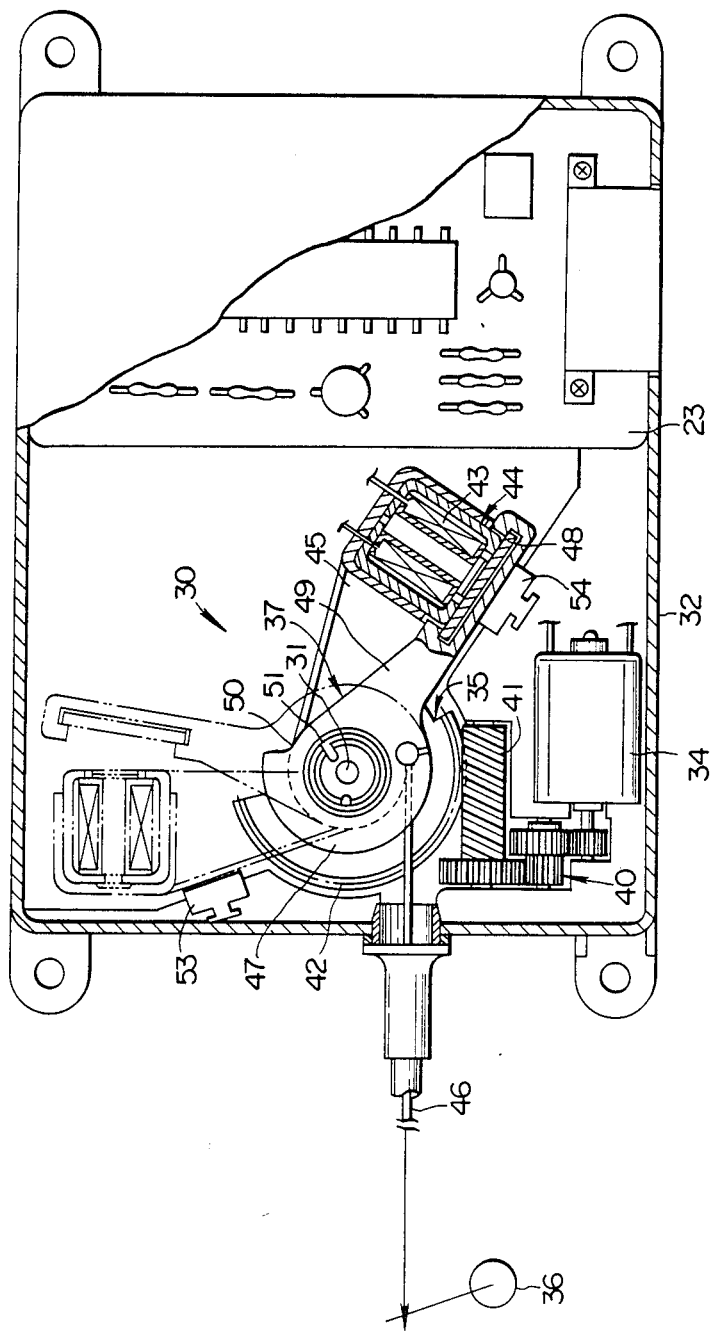
FIG. 3 is a fragmentary horizontal sectional view showing the construction of the controller and actuator in FIG. 2.

FIGS. 2-6 are diagrams showing an example of the automatic car-speed controller according to this invention, FIG. 2 is a diagram illustrating the circuitry of the automatic car-speed controller, and FIG. 3 and FIG. 4 are a fragmentary horizontal sectional view and a vertical sectional view showing the construction of the actuator, respectively.

In FIG. 2, numeral 21 is a car-speed sensor for outputting operating data proportional to the actual car-speed (corresponding to the car-speed sensor 10 shown in FIG. 1), numeral 22 is a command switch for outputting a cruise command signal (corresponding to the command switch 11 shown in FIG. 1). The command switch 22 comprises a setting switch 22a, a resuming switch 22b and an accelerating switch 22c. Outputs from the car-speed sensor 21 and command switch 22 are supplied to a microcomputer 26 that is the control part of controller 23 through an interface S 24 and an interface C 25 in the controller 23, respectively.

The microcomputer 26 houses a car-speed memorizing means (corresponding to the car-speed memorizing means 12 shown in FIG. 1) which memorizes the actual car-speed which is supplied as operating data (pulse signal) from the car-speed sensor 21 in response to operation of the setting switch 22a, and a control means (corresponding to the control means 13 shown in FIG. 1) which maintains the car-speed corresponding to the difference between the actual and memorized car-speed in the case of controlling the car-speed, and which places the actuator 30, described later, in the idling state in the case of cancelling the system.

Numeral 30 indicates an actuator of the motor driving type (corresponding to the actuator 9 shown in FIG. 1) which drives a throttle 36 (corresponding to the throttle 7 shown in FIG. 1) of a vehicle as described later. Explaining the actuator 30 according to FIG. 3, a shaft 31 is supported between an actuator case 32 (hereinafter called the "case") and an actuator cover 33 closing the opening of said case 32. A sector wheel 35 (corresponding to the sector wheel 4 shown in FIG. 1) is rotatably driven by the rotation of motor 34 (corresponding to the motor 1 shown in FIG. 1) and an output pulley 37 (corresponding to the output pulley shown in FIG. 1) is rotatably fitted to the shaft 31 for driving a throttle 36 (corresponding to the throttle 7 shown in FIG. 1).

Figure 5:
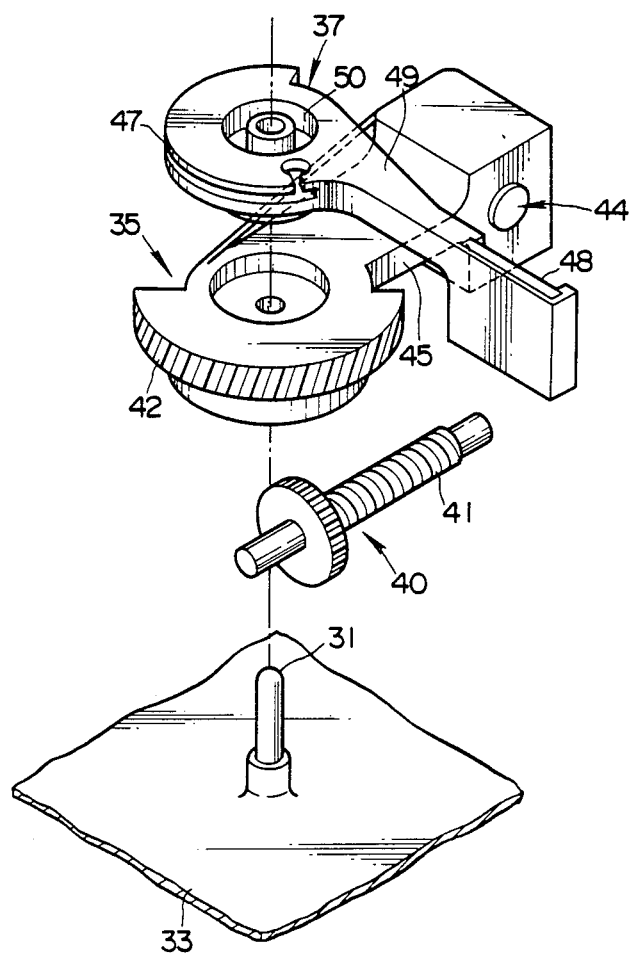
FIG. 5 is a perspective exploded view of the principal parts of FIG. 3.

The sector wheel 35 which forms a part of a solenoid clutch, as shown in FIG. 5, is provided with a fan-like-shaped gear portion 42 engaged with a worm 41 of a reduction gear 40 (corresponding to the reduction gear 2 shown in FIG. 1) for reducing the rotational speed of the motor 34. A solenoid 44 (corresponding to the solenoid 3 shown in FIG. 1), containing an electromagnetic coil 43 at a position distant from the rotational center thereof, has a construction wherein the gear portion 42 and solenoid 44 are connected with a sector arm 45 as a body, and the solenoid 44 oscillates upon rotation of the motor 34.

With respect to the output pulley 37 forming the solenoid clutch together with said sector wheel 35, as shown also in FIG. 5, the output pulley 37 is provided with a pulley portion 47 attached with a throttle cable 46 (corresponding to the throttle cable 5 shown in FIG. 1) connected with the throttle 36 at a point near an outer periphery thereof, and a magnetic body 48 (corresponding to the magnetic body 6 shown in FIG. 1) attracted by the working of said solenoid 44. The construction is such that the pulley portion 47 and magnetic body 48 are connected with an arm 49 in a body. The arm 49 is shifted to the upper side in order to avoid the interference with the sector arm 45 of sector wheel 35, and the magnetic body 48 is deflected to the under side of the arm 49 and arranged at the upper part of the sector wheel 35 as shown in FIG. 4 in order to facilitate the attraction with said solenoid 44. Additionally, the outer periphery of the pulley portion 47 attached with the throttle cable 46 is located at a position nearer than the solenoid 44 to the rotational center (that is the shaft 31).

Furthermore, on the output pulley 37 as shown in FIG. 3, a ring-shaped groove 50 is formed at the position near the center, and said groove 50 contains a spring 51. The spring 51 which is fixed in the groove 50 of the output pulley 37 at one end thereof and hooked on a projection 56 of the case 32 at another end thereof always energizes the output pulley 37 toward the idling position (shown by solid lines in FIG. 3). At the working end, the sector wheel 35 and the output pulley 37 are protected by shock absorption dampers 53 and 54, respectively.

Numeral 60 in FIG. 2 is a motor driving circuit which exists in the controller 23 and rotates the motor 34 of said actuator 30 in a forward or reverse direction. The motor driving circuit 60 comprises forward rotational switching portions 61 and 62 for rotating the motor 34 in the forward direction corresponding to the forward rotational signal from the microcomputer 26, reverse rotational switching portions 63 and 64 for rotating the motor 34 in the reverse direction corresponding to the reverse rotational signal from the microcomputer 26, p-n-p type transistor Tr1 and Tr2, and resistors R1-R4.

Numeral 70 is an actuator switching portion which exists in the controller 23 and switches the power to the soleniod 44 of said actuator 30 on or off. The switching operation is done through a relay 71 comprising relay coil 71a operated according to the controlling signal fed from the microcomputer 26 and a relay switch 71b.

Numeral 80 is a brake switch, numeral 81 a brake lump, and numeral 82 a cancel switch set to the OFF-state in linkage with operation of the brake switch 80. At the time of braking operation, the signal for cancelling the system, that is the ON-signal of the brake switch 80, is inputted into the microcomputer 26 through the inteface B 83 in the controller 23, and the power supply to the solenoid 44 of the actuator 30 is cut off according to the OFF-signal of cancel switch 82.

Numeral 84 is a constant-voltage circuit, numeral 85 is a reset circuit, numeral 86 is a power source, numeral 87 is a main switch for the control device and numeral 88 is a cruise lump.

Furthermore, the controller 23 is housed in the case 32 in company with the actuator 30, the wiring between the controller 23 and actuator 30 at the manufacturing time prevents accidents such as a mis-connections.

Next, the action of the automatic car-speed controller having the above construction will be explained including FIGS. 6(a)–(d).

It is necessary to maintain the main switch 87 in the ON-state in order to operate the automatic car-speed controller. Hereupon, the car-speed sensor 21 outputs the pulse signal, that is the operating data proportional to the actual car-speed, to the microcomputer 26 in the controller 23. The pulse signal is sampled for a specified time such that the microcomputer 26 detects the pulse number proportional to the car-speed.

In this state, upon turning off the setting switch 22a of the command switch 22 subsequent to the ON-operation, the setting command is inputted to the microcomputer 26 in the controller 23, and the memorizing menas of the microcomputer 26 memorizes the car-speed at the time of OFF-operation according to said setting command.

The control means of the microcomputer 26 calculates an initialized value corresponding to said memorized car-speed and actuates the actuator 30 according to said initialized value.

Figure 6A:
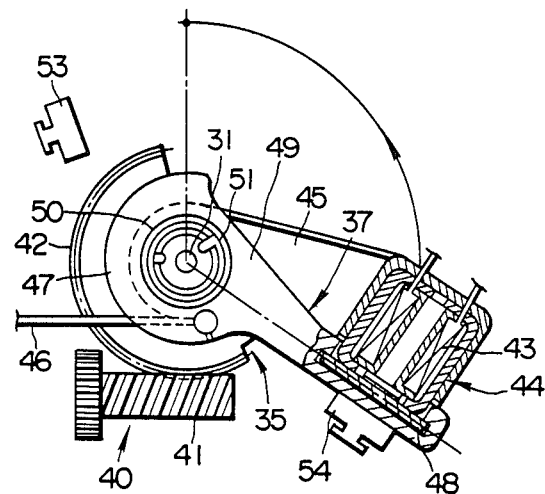
FIGS. 6(a)-(d) are diagrams illustrating the working state of the actuator at respective operational steps.

Namely, making the actuator switching portion 70 switch to the ON-state by means of the control signal from the microcomputer 26 and exciting the relay coil 71a of relay 71 to attract the relay switch 71b, the circuit, namely the power source 86→ the cancel switch 82→ the relay switch 71b of relay 71→ the solenoid 44 of actuator 30→ the ground, is formed, so that the solenoid 44 of sector wheel 42 attracts the magnetic body 48 of output pulley 37 and makes preparations as shown FIG. 6(a).

Figure 6B:
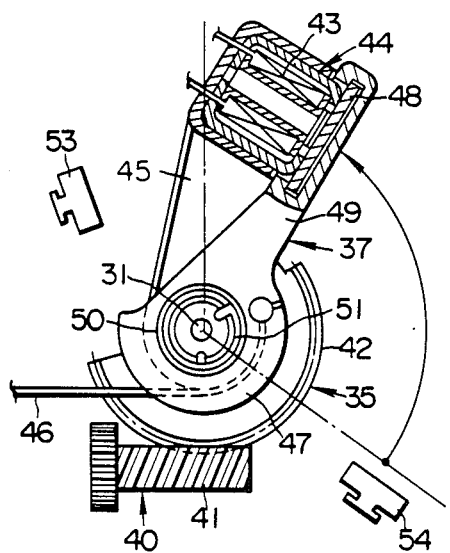

On the one hand, when the microcomputer 26 causes forward rotational switching portions 61 and 62 of motor driving circuit 60 switch on the ON-state by means of the control signal corresponding to the initialized value and the transistor Tr1 is switched to the ON-state by conduction of the base current, the circuit, namely the power source 86→ the main switch 87→ the transistor Tr1 of motor driving circuit 60→ the motor 34 of actuator 30→ the forward rotational switching portion 64 of the motor driving circuit 60→ the ground, is formed, and the sector wheel 35 is rotated counterclockwise according to the forward rotation of the motor 34 as shown in FIG. 6(b).

In this occasion, because the solenoid 44 of the sector wheel 35 is located in the position away from the rotational center thereof and the throttle cable 46 attached to the output pulley 37 is located in the position close to the rotational center thereof, the torque applied on the solenoid 44 to drive the throttle 36 decreases, so that the magnetic body 48 of the output pulley 3 can be sufficiently attracted by even the small-sized solenoid 44 and accompany the rotation of sector wheel 35 as shown in FIG. 6(b).

Therefore, the vehicle can travel at a memorized speed holding the throttle 36 in the prescribed position through the throttle cable 46.

When the actual car-speed becomes higher than the memorized car-speed, the microcomputer 26 actuates reverse rotational switching portions 63 and 64 of the motor driving circuit 60 to rotate the motor 34 in the reverse direction causing the throttle 36 to close slightly so as to reduce the actual car-speed. Contrary to above, when the actual car-speed becomes lower than memorized one, the microcomputer 26 actuates the forward rotational switching portions 61 and 62 of the motor driving circuit 60 to rotate the motor 34 in the forward direction causing the throttle 36 to open slightly so as to increase the actual car-speed. Therefore, the microcomputer 26 regulates the actuator 30 to harmonize the actual car-speed with the memorized car-speed and makes the vehicle proceed at a constant traveling speed.

On the other hand, when the system is cancelled by the braking operation or the like, the cancel signal, that is the ON-signal of the brake switch 80, is fed to the microcomputer 26 through the interface B 83 in the controller 23. Simultaneously, the cancel switch 82 interlocking with said brake switch 80 is switched to the OFF-state to cut off the charging to the solenoid 44 of the actuator 30. Additionally, the microcomputer 26 causes the actuator switching portion 70 to switch into the OFF-state and maintains it above a described state.

Figure 6C:
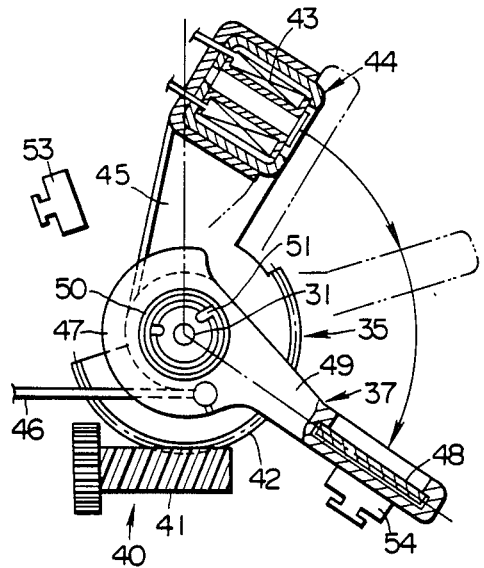
Figure 6D:
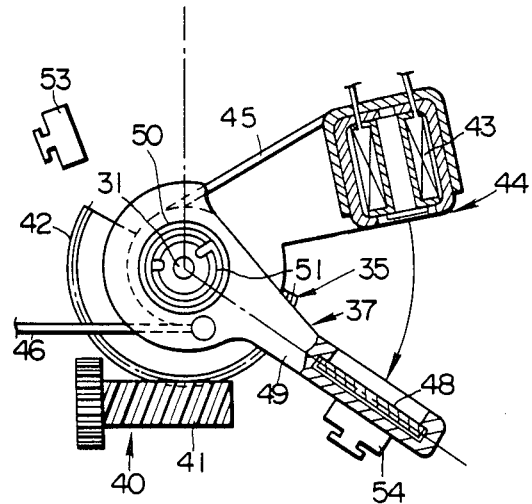
Figure 8:
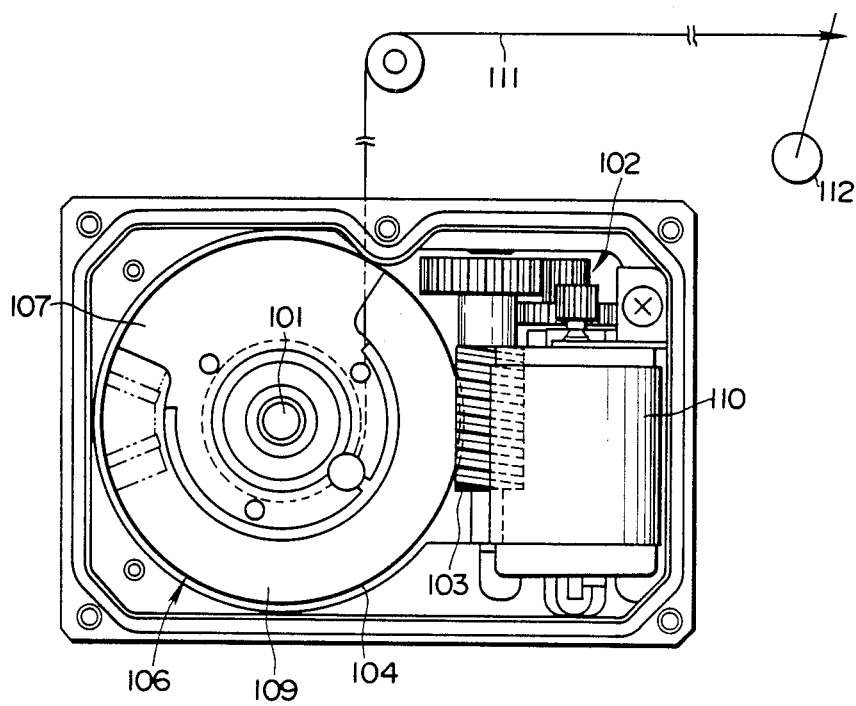

By cutting off the charging to the solenoid 44 with electricity, the output pulley 37 of actuator 30 becomes rotatably against the shaft 31 without the influenece of the residual magnetization because the small-sized solenoid can be used, therefore the output pulley 37 is rotated clockwise and forced to be returned to the idling position by the energizing spring 51 as shown in FIG. 6(c).

Hereupon, the motor 34 rotates in the direction corresponding to the idling position according to the control signal from the microcomputer 26, so that the sector wheel 35 rotates clockwise chasing the output pulley 37 and returns quickly to the idling position. Namely, it is possible to turn to practice the car-speed control immediately even if the setting switch 22a is operated again.

Furthermore, since the occupied space of the solenoid 44 can be reduced by using the small-sized solenoid 44, the actuator 30 can be made smaller in thickness. In addition, because the actuator 30 and controller 23 are housing together in the case 32 and compose one module, it is possible to attach on the vehicle without difficulty.

As mentioned above, the actuator according to this invention includes an actuator for driving the throttle by a motor with a reduction gear, and a solenoid clutch comprising the sector wheel rotatable around a shaft and the output pulley rotatable independently from said sector wheel around said shaft coaxially through the throttle cable, said sector wheel consisting of a gear portion engaged with said reduction gear of the motor, the solenoid, and the sector arm alienating said solenoid from the rotational center thereof as a body, and said output pulley consisting of the pulley portion attached with said throttle cable at the point near to the outer periphery thereof, the magnetic body attracted by said solenoid of the sector wheel, and the arm connecting said magnetic body with said pulley portion as a body. And said solenoid is allocated at the position more distant than that of the outer periphery of said pulley portion from the rotational center. Therefore, the output pulley can be accompanied with the sector wheel even by the small-sized solenoid having a weak attractive force according to the principle of the lever, and the throttle can be driven thoroughly, as the distance between the solenoid and the rotational center is sufficiently long as compared with the distance between the point attached with the throttle cable and the rotational center.

Consequently, the incorporated state of the output pulley with the sector wheel can be disengaged very quickly according to directions from the control means in the case of cancelling the system because the magnetic body is not affected by the residual magnetization, so that an excellent effect is obtained that the automatic car-speed controller having high reliability can be provided.

What is claimed is:

1. In an automatic car-speed controller having an actuator for driving a throttle by a motor with a reduction gear, and a solenoid clutch according to a signal from a control means, said solenoid clutch including:

a sector wheel rotatable around a shaft and comprised of a gear portion engaged with said reduction gear of said motor, a solenoid and a radially extending arm locating said solenoid in spaced relation to said shaft; and an output pulley rotatably independently from said sector wheel around said shaft coaxially therewith, and comprised of a pulley portion attached to a throttle cable at a point adjacent an outer periphery thereof, a magnetic body adapted to be attracted by said solenoid of the sector wheel, and an arm connecting said magnetic body with said pulley portion;

said solenoid being disposed at a position of greater distance that of the outer periphery of said pulley portion from said shaft.

2. An automatic car-speed controller having:

a car-speed sensor for outputting an operating data proportional to an actual car-speed;

a command switch for outputting a cruise command signal;

a car-speed memorizing means for memorizing the operating data of said car-speed sensor in repsonse to an operation of said command switch;

actuator means for driving a throttle including a motor with a reduction gear, a solenoid clutch and a throttle cable; and a control means for supplying a power to a solenoid of said actuator;

said solenoid clutch comprising:

a sector wheel rotatable around a shaft, and comprised of a gear portion engaged with said reduction gear of said motor, a solenoid, and a radially extending arm locating said solenoid in spaced relation to said shaft; and an output pulley rotatable independently from said sector wheel around said shaft coaxially therewith, and comprised of a pulley portion attached to said throttle cable at a point adjacent an outer periphery thereof, a magnetic body adapted to be attracted by said solenoid of the sector wheel, and an arm connecting said magnetic body with said pulley portion, as a body;

Spring means for normally biasing said output pulley to an idle position; and said solenoid being disposed at a position of greater distance that of the outer periphery of said pulley portion from said shaft; and said control means giving a command to said motor corresponding to a difference between actual car-speed and memorized car-speed in order to control a car-speed, and cutting off a power supply to said solenoid in order to cancel an automatic car-speed control and outputting a reverse rotational command to the motor so as to return said sector wheel to an idling position when said output pulley returns to said idle position.

* * * * *